US008814630B2

(12) United States Patent
Rittberger

(10) Patent No.: US 8,814,630 B2
(45) Date of Patent: Aug. 26, 2014

(54) PVC BEEHIVE

(76) Inventor: Carl T. Rittberger, Stuart, FL (US)

( * ) Notice: Subject to any disclaimer, the term of this patent is extended or adjusted under 35 U.S.C. 154(b) by 54 days.

(21) Appl. No.: 13/343,479

(22) Filed: Jan. 4, 2012

(65) Prior Publication Data

US 2013/0005216 A1    Jan. 3, 2013

Related U.S. Application Data

(60) Provisional application No. 61/429,649, filed on Jan. 4, 2011.

(51) Int. Cl.
*A01K 47/00* (2006.01)
*A01K 47/06* (2006.01)

(52) U.S. Cl.
USPC ................................ 449/30; 449/32; 449/3

(58) Field of Classification Search
USPC ............. 449/13, 3, 15, 32, 30, 34, 20, 23, 26, 449/27, 28; 428/130; 119/499
See application file for complete search history.

(56) References Cited

U.S. PATENT DOCUMENTS

| | | | | |
|---|---|---|---|---|
| 83,388 | A | * | 10/1868 | Johnson |
| 791,754 | A | * | 6/1905 | Danzenbaker ................. 449/16 |
| 1,048,950 | A | * | 12/1912 | Danzenbaker ................. 449/34 |
| 1,871,595 | A | * | 8/1932 | Eldred ............................ 449/30 |
| 1,889,184 | A | * | 11/1932 | Siemers .......................... 449/30 |
| 2,599,141 | A | * | 6/1952 | Taylor ............................ 449/12 |
| 3,943,022 | A | * | 3/1976 | Susnjara ....................... 156/211 |
| 4,077,075 | A | | 3/1978 | Schade |
| 4,135,265 | A | | 1/1979 | Van de Kerkof |
| 4,160,052 | A | * | 7/1979 | Krysiak et al. ................. 428/31 |
| 4,199,832 | A | | 4/1980 | Glasscock et al. |
| 4,322,861 | A | | 4/1982 | Healy |
| 4,367,563 | A | | 1/1983 | Ferguson et al. |
| 4,443,904 | A | | 4/1984 | van Muyden |
| 4,524,476 | A | * | 6/1985 | Adams, IV ..................... 449/27 |
| 5,162,014 | A | * | 11/1992 | Moore et al. ..................... 449/2 |
| 5,211,597 | A | * | 5/1993 | Scott et al. ..................... 449/27 |
| 6,026,951 | A | * | 2/2000 | Ovadia et al. ................. 206/6.1 |
| 2005/0229821 | A1 | * | 10/2005 | Usselmann ..................... 108/86 |

FOREIGN PATENT DOCUMENTS

WO    WO 2009004550 A1 *   1/2009   ............ A01K 47/00

* cited by examiner

*Primary Examiner* — Rob Swiatek
*Assistant Examiner* — Kathleen Alker
(74) *Attorney, Agent, or Firm* — McHale & Slavin, P.A.

(57) ABSTRACT

The instant invention describes a beehive constructed and arranged to contain one or more components which are assembled using minimal amounts of fastening devices. The beehive includes one or more hive bodies, such as deep hive bodies or honey super bodies preferably made of rot proof PVC board, which are designed to house or store a bee colony, bee brood, and honey. Each of the bodies is designed to contain one or more walls which are secured together to form the body structure. The bodies are constructed of a single unit structure having one or more integral hinged members that join two rigid members together, allowing the two rigid members to fold along the line of the hinge. By folding along the line of the hinge, a desired shape can be constructed and secured without the need for additional fastening devices, such as screws or nails.

11 Claims, 11 Drawing Sheets

PVC BEEHIVE

CROSS REFERENCE TO RELATED APPLICATION

This application claims priority under 35 USC 119(e) to the U.S. Provisional Application No. 61/429,649, filed Jan. 4, 2011, entitled, "PVC Beehive", the entire disclosure of which is incorporated herein by reference.

FIELD OF THE INVENTION

The invention relates to beehives, and more particularly, to beehives containing one or more hive bodies which act as either a brood chamber or honey storage and can be manufactured as a single unit and assembled using minimal fastening devices.

BACKGROUND OF THE INVENTION

While most individuals think of bee colonies for the production of honey, bees have a very important role in the pollination of a variety of plants. It is estimated that certain bees can pollinate an estimated 100 different crops. The need for commercial bee colonies is great, as the amount of bees found in the wild could not perform the pollination required for commercial crops in a timely manner. Bee colonies housed in artificial beehives provide commercial growers of various crops the ability to have their crops pollinated in shorter periods of time and ripen at controlled intervals, thereby saving growers the expense of having to harvest smaller crops several times throughout the particular crop season.

Although beehives can assume any shape and size, the Langstroth beehive is the most common design. It was named after Rev. Lorenzo Langstroth who designed this style in 1860. The basic design includes use of standard sized rectangular boxes having no tops or bottoms, hive bodies, and internal frames which allow for interchangeable part capability. The hive bodies are constructed of several pieces of wood materials which are secured together thereby to form the overall structure. While this type of construction produces sturdy beehives, using multiple pieces individually secured to each other increases the risk that the pieces become non-functional over time and thus require replacement, and additionally requires initial preparation of each of the individual wood pieces, i.e. painting, which could be harmful to the colony, and increases the cost associated with shipping an intact unit or the several pieces which make up the unit.

DESCRIPTION OF THE PRIOR ART

U.S. Pat. No. 4,077,075 describes a honeycomb frame for a beehive which is comprised solely of frame-forming elements of C-profile whose channels are inwardly directed. The abutting ends of these elements are connected by coupling members slidable into the C-profiles and in frictional engagement with the abutting ends. A queen cell cup and pre-wired foundations are attached to the frame by fastening elements slidably mounted in the C-profile of the frame elements.

U.S. Pat. No. 4,135,265 describes a bee hive having a bottom section including inclined boards extending upwardly from the front and rear walls to meet at about the center of the top of the side walls. A first space beneath the boards and a second space above the boards are formed. Internal vents in the side walls are created to permit air flow between the first space and the second space. At least one closeable vent in each side wall communicates the first space with the exterior of the bottom sections. At least one closeable vent in the rear wall communicates the second space with the exterior of the bottom section. A hive section having double walls is provided. The hive has a top section comprising an inner cover that can be adapted to function as a feed storage and provides insulation, a reversible inner lid, and an outer lid.

U.S. Pat. No. 4,199,832 describes a preparation of beehives using synthetic resinous material which is acceptable to the bees. The material used is resistant to attack by vermin. The hives are formed from molded urethane foam panels. The urethane foam is formulated to produce a product which is not rejected by the bees and which does not make the bees nervous or otherwise interfere with their normal habits in secreting honey.

U.S. Pat. No. 4,322,861 describes a pollen collecting entrance structure for a beehive comprising a base for supporting a beehive. The base defines an accessway providing communication with the exterior of the base and a space. The space is in open communication with the beehive. The beehive further contains a grid which is removably mounted across the path through the space between the accessway and the beehive. A removable receptacle is located below the grid to collect the pollen dislodged from the bees' bodies when passing through the grid. The grid and receptacle are removable from the base without the need to disturb the beehive.

U.S. Pat. No. 4,367,563 discloses a combination pollen trap and containment apparatus for attachment to a bee hive having a frame attachable at the opening of the hive. The frame defines a pathway through which the bees must pass to gain entrance to the hive. A pollen collection screen is detachably securable in the pathway, and bees entering and leaving the hive are forced to pass through the screen causing pollen pellets to be loosened from the body and legs of the bees. The screen can be easily removed when it is desired to open the hive. A pollen drawer is located below the pollen screen and serves to collect the pollen that falls from the bees. A containment screen is also securable in the pathway to retain the bees within the hive. The containment screen has openings to provide for ventilation and permit the beekeeper to feed the bees during periods of confinement.

U.S. Pat. No. 4,443,904 describes a bee hive assembly comprising one or more hive elements supported as a stack on a base element and covered by a roof element. Each hive element comprises a frame having at each of two opposite sides a window-like frame opening covered by a transparent panel. A liquid storage tank is fittingly mounted in the frame opening inwardly of and spaced from the transparent panel. The storage tank has transparent walls, a removable cover closing its upper side, and a drinking trough formed at the bottom end of the rear wall of the tank and having a width smaller than the width of the body of a worker-bee. The tank is provided with a liquid level control for maintaining the liquid in the drinking trough at a constant level which is accessible to the bees from the interior of the hive.

SUMMARY OF THE INVENTION

The instant invention describes a beehive which is constructed and arranged to contain one or more components which are assembled using minimal amounts of fastening devices. The beehive includes one or more hive bodies, such as deep hive bodies or honey super bodies, which are designed to contain bees, bee brood (eggs, larvae, and pupae), and store food, such as honey and pollen. Each of the bodies is designed to contain a plurality of walls which form the body structure.

The structure is designed to hold a plurality of free hanging frames stored within. The bodies are constructed of a single unit structure having one or more fold lines, such as integral hinged members and attachment members at the first end and second end of the unit. Preferably, the integral hinged members are living hinges, i.e. thin flexible hinges or flexure bearings that join two rigid members together, allowing the two rigid members to fold along the line of the hinge. By folding along the line of the hinge, a desired shape can be constructed and secured without the need for additional fastening devices, such as screws or nails.

Traditional beehives are composed of bodies made of several parts which are secured together using a plurality of screws, nails, pins, or other fastening devices which must be attached to each of the individual components. By constructing the bodies of a single unit structure and eliminating the use of additional fastening devices, the bodies in accordance with the instant invention can be easily manufactured, shipped in a flat position, and easily assembled. Because there are not externally added parts, such as screws, the risk of such parts rusting when exposed to the elements are minimal, thereby reducing the need for disrupting the bee colony should the rusted parts need to be replaced or are no longer functional. Moreover, because only a single unit structure is required to produce the final product, shipping costs are substantially reduced.

Accordingly, it is an objective of the instant invention to provide a beehive which contains components that can be assembled without the need for additional fastening devices.

It is a further objective of the instant invention to provide a beehive having one or more deep hive bodies which is made of a single unit structure.

It is yet another objective of the instant invention to provide a beehive having one or more deep hive bodies which can be assembled without the need of additional fastening members.

It is a still further objective of the instant invention to provide a beehive having one or more deep hive bodies which is made of a material which will not rot, decay, or decompose.

It is a further objective of the instant invention to provide a beehive having one or more deep hive bodies which contain air vents which are designed to allow free flow of air while preventing moisture from coming inside.

It is a still further objective of the invention to provide a beehive having one or more honey super bodies which is made of a single unit structure.

It is a further objective of the instant invention to provide a beehive having one or more honey super bodies which can be assembled without the need of additional fastening members.

It is a still further objective of the instant invention to provide a beehive having one or more honey super bodies which is made of a material which will not rot, decay, or decompose.

It is a further objective of the instant invention to provide a beehive having one or more honey super bodies which contain air vents which are designed to allow the free flow of air while preventing moisture from coming inside.

It is yet another objective of the instant invention to provide a beehive having one or more deep hive bodies and/or honey super bodies which can be easily manufactured.

It is a still further objective of the invention to provide a beehive having one or more deep hive bodies and/or honey super bodies which can be shipped in a flat configuration.

It is a further objective of the instant invention to provide a kit which contains the necessary components to provide for a beehive that can be assembled without the need for additional fastening devices.

It is yet another objective of the instant invention to provide a kit which contains one or more deep hive bodies and/or honey super bodies which can be assembled without the need of additional fastening members.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
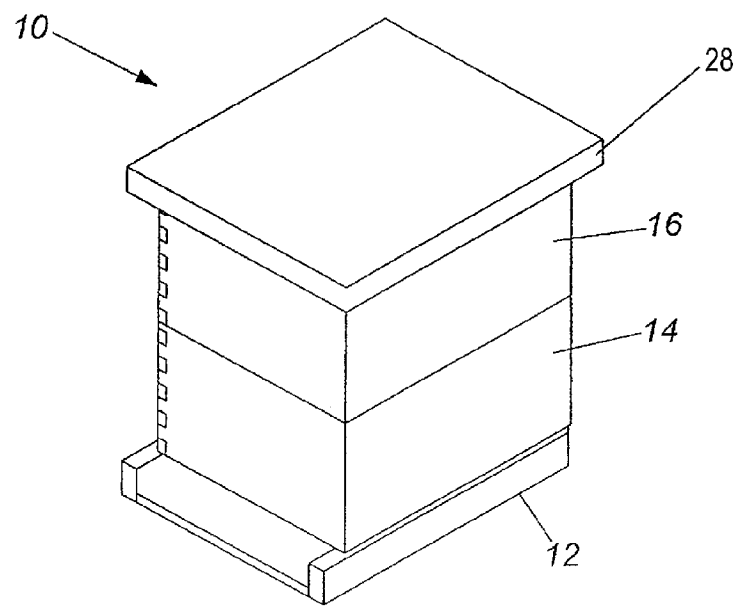
FIG. 1 is a perspective view of an illustrative embodiment of the beehive in accordance with the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
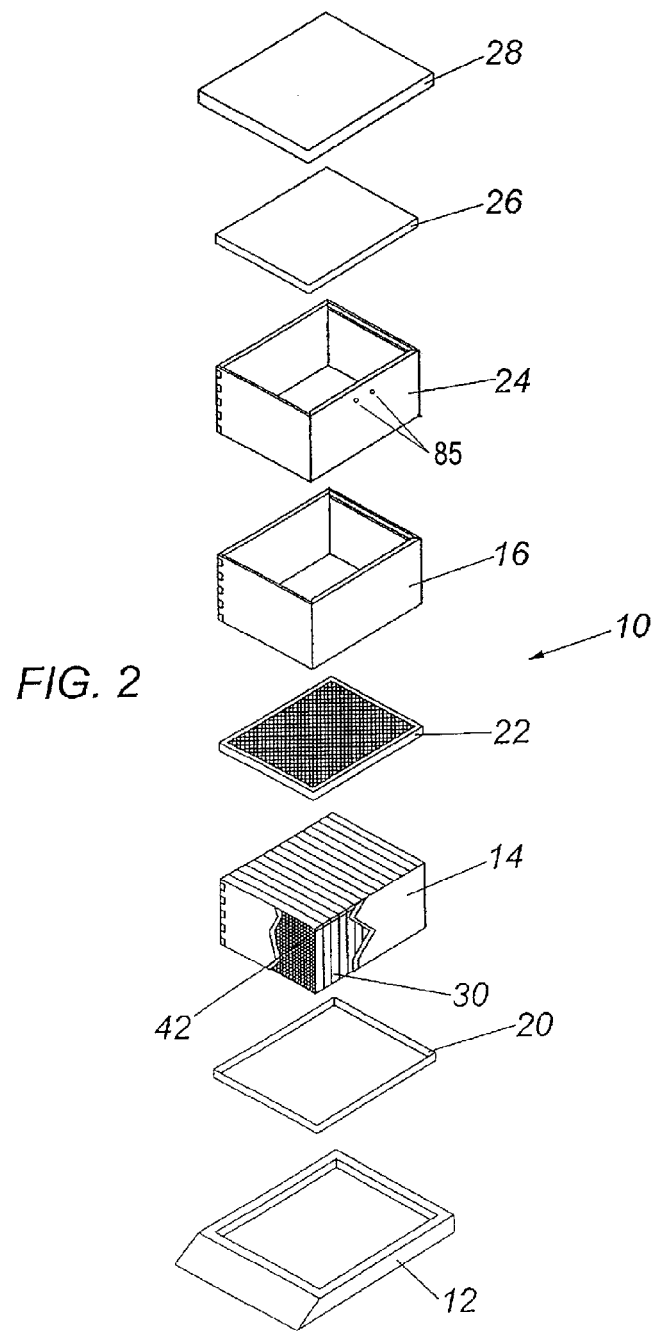
FIG. 2 is an exploded view of an illustrative embodiment of the beehive in accordance with the instant invention.
Figure 3:
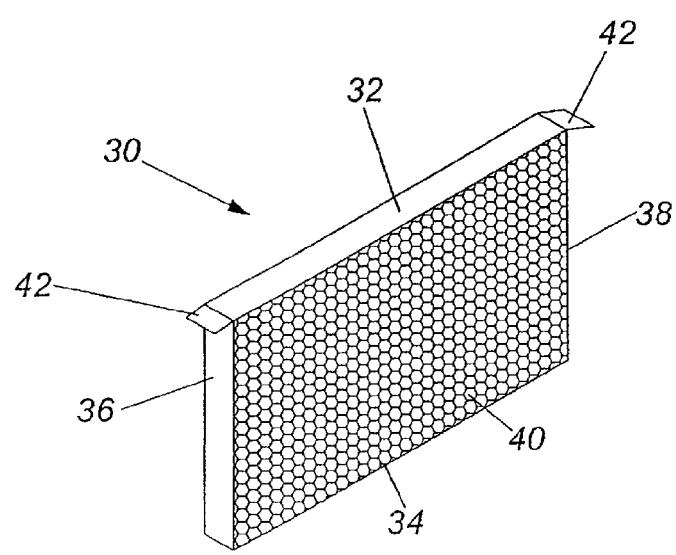
FIG. 3 is a perspective view of an illustrative embodiment of a frame in accordance with the instant invention.

FIG. 1 illustrates a perspective view of the beehive, generally referenced as 10, constructed according to a preferred embodiment of the present invention. The beehive 10 contains a hive stand 12, one or more deep hive bodies 14 and 16, and an outer cover 28. FIG. 2 is an exploded view of the beehive 10, illustrating additional features thereof. In addition to providing support for the upper components of the beehive 10, the hive stand 12 provides a landing board for the bees as they enter the beehive through the bottom board 20. The bottom board 20, which provides a foundation for the entire beehive 10, is constructed and arranged to fit within the hive stand 12. In this configuration, the hive stand 12 provides the bottom board 20 protection from moisture, ground contamination, and cold transfer.

The hive body 14 is constructed and arranged to rest on top of the bottom board 20, providing the first story of the bee hive. While not necessary, the hive body 14 contains the brood nest, housing the beehive larvae and eggs. Optionally, the beehive 10 may contain a separating member, such as a queen extruder, illustrated herein as screen 22. The queen extruder is designed to allow movement of bees other than the queen to various parts of the hive. However, the screen 22 may also be employed to prevent movement of other bees to one or more sections of the beehive 10. It is typically placed between the hive body 14 which houses the hive's brood nest and other parts of the hive. In this manner, the movement of the queen bee is restricted to the brood nest, allowing worker bees to pass through, but not the queen. While FIG. 2 illustrates the beehive 10 having two hive bodies 14 and 16, the actual number of hive bodies can be unlimited, and depend on the size of the hive the user wants to create. The hive bodies are typically constructed in a generally rectangular-shaped configuration and can be sized having deep, medium depth, and shallow depth. However, the shapes of the hive bodies 14 and 16 as illustrated are not intended to be a limiting shape. Each of the hive bodies 14 and 16, therefore, may be constructed to various dimensions and shapes as determined by the user.

In addition to, or in place of, the hive bodies 14 and 16, the beehive 10 may contain one or more honey super bodies 24. The honey super bodies 24, typically the upper most box, is similar in construction to the hive bodies 14 or 16 and is used to provide storage for the majority of the honey or pollen that is produced or used by the bee colony. Resting above either the honey super body 24 or the deep hive body 16 is an optional inner cover 26. The inner cover 26 provides separation of the inner components of the beehive 10 from the outer cover 28 by providing insulating air space between such components. The outer cover 28 is constructed in such a manner so as to fit over the uppermost hive body. While the outer cover 28 may be constructed to rest flat upon the uppermost hive body or honey super body, a preferred embodiment includes a telescoping outer cover 28 which fits over the top of the upper most hive body 16 or honey super body 24.

Resting inside of the hive bodies 14, 16 and/or honey super body 24 are a plurality of frames. The frames 30 may be made from various types of material, such as wood or plastic. Each of the frames contains a top wall 32 and a bottom wall 34, and two opposing side walls 36 and 38. The inner portion of the frame 30, i.e. the portion framed by walls 32, 34, 36 and 38, contain wax or plastic sheets with honeycomb impressions, 40. The frame 30 may be designed to fit snuggly within hive bodies and move in and out as needed by vertically sliding each frame. Alternatively, the frames may contain one or more ledges, or overhang portions 42, for attachment to a portion of the hive body. In this manner, each of the frames 30 hang from the top of the hive body and can be easily obtained by the user by grasping a portion of the upper wall 32 or simply holding the overhang portions 42 and lifting the frame 30 in an upward motion. Either technique allows the user the ability to investigate individual frames without disturbing the other frames resting within.

Figure 4:
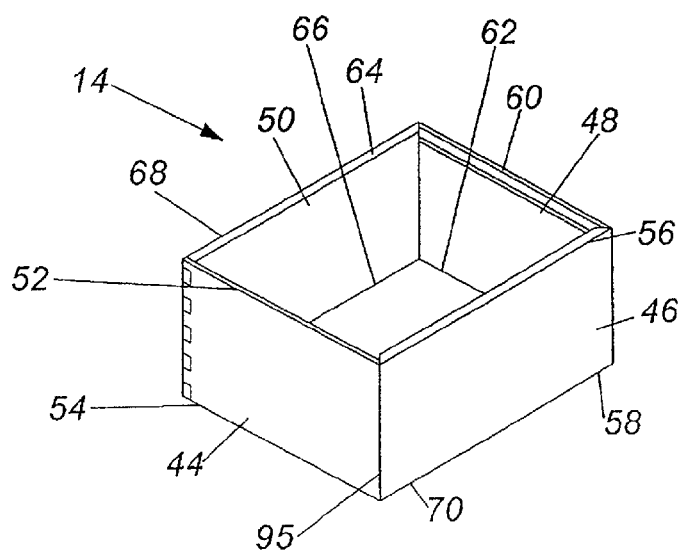
FIG. 4 is a perspective view of an illustrative embodiment of the deep beehive body in accordance with the instant invention.
Figure 5:
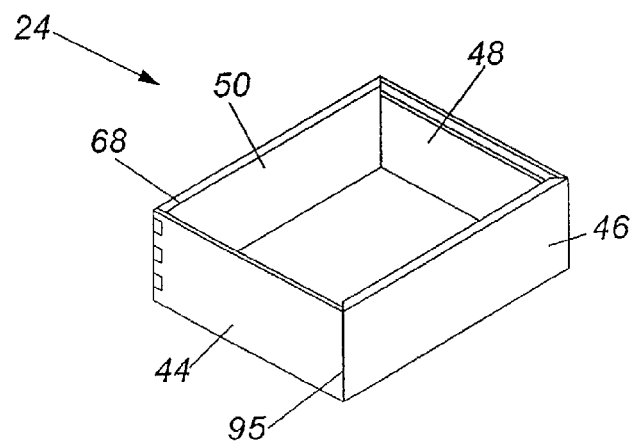
FIG. 5 is a perspective view of an alternative embodiment of the honey super body in accordance with the instant invention.

Referring to FIGS. 4 and 5, a perspective view of the deep hive body 14 is illustrated. The deep hive body 14 is comprised of a plurality of side walls 44, 46, 48, and 50. The side walls are constructed and arranged to form an enclosed area, thereby holding one or more frames 30 which are preferably arranged in a parallel manner. Each of the side walls contains a top side and a bottom side. For example, the side wall 44 contains the top side 52 and the bottom side 54. The side wall 46 contains the top side 56 and the bottom side 58. The side wall 48 contains the top side 60 and the bottom side 62. The side wall 50 contains the top side 64 and the bottom side 66.

Each of the top sides 52, 56, 60, and 64 forms the upper perimeter 68 of the deep hive body 14. Each of the bottom sides 54, 58, 62, and 66 form the lower perimeter 70 the deep hive body 14. The deep hive body may optionally contain a bottom board 20 In this manner, the deep hive body may be used to transport an existing beehive colony by placing a cover 28 which can be fitted to secure along the top upper perimeter 68 of the deep hive body 14. The distance between the upper perimeter 68 and the lower perimeter 70, which defines the height of each of the deep hive bodies, can be varied to create deep hive bodies of varying sizes. In an illustrative example, the distance may be 9⅝". FIG. 5 illustrates a hive body having a distance of 6⅝", which can be used as a honey super body.

Figure 6:
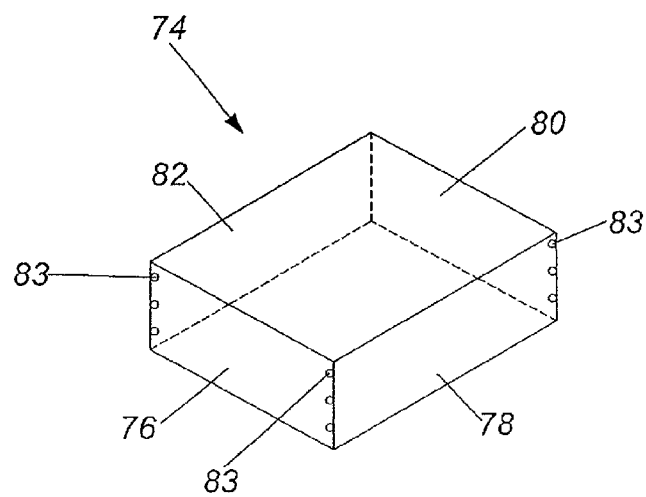
FIG. 6 is a perspective view of a standard deep beehive body known in the prior art.

In the constructed form, the deep hive body 14 is similar in design as that of a standard deep hive body. FIG. 6 illustrates a typical standard bee hive body 74. The standard bee hive body 74 includes a plurality of walls 76, 78, 80, and 82. The walls are separate units which are interconnected together to form the overall shape. For example, to secure wall 76 to wall 78 and 82, fastening hardware, illustrated herein as nails or screws 83, is inserted through wall 76 and into walls 78 and 82. While such securing means is effective, the construction of the deep hive body in this manner has several disadvantages.

By constructing the deep hive body with a plurality of individual pieces, delivering each of the pieces increases shipping costs, which add to the overall cost of developing hives for commercial use as well as for the do-it-yourself kits sold to hobbyists. For those customers that do not want to assembly a plurality of individual components, shipping a fully assembled beehive body to them can add significant costs. Finally, long term use of nails or screws as fastening devices reduces the overall strength of the units each year they are exposed to the environment and the affects of weathering. Weakening of one of the connections results in destruction of the entire deep hive body, requiring the additional expense of purchasing another deep hive body. Moreover, wasted time and the risk of destruction to an established bee colony associated with transferring the contents to another hive increases.

Figure 7:
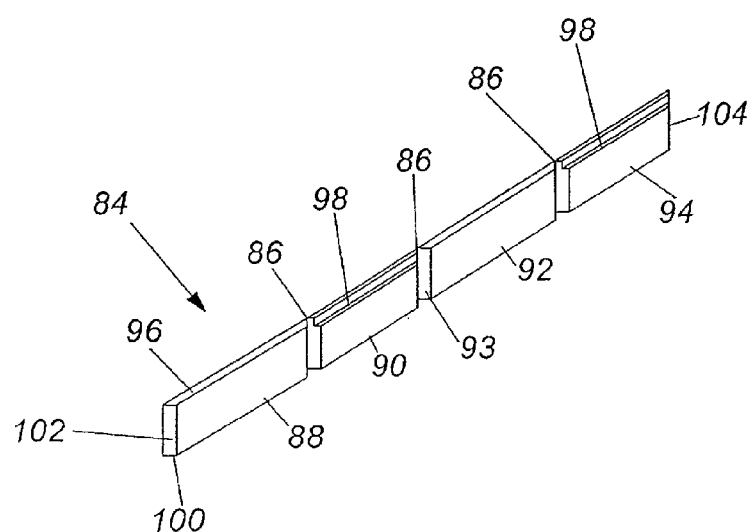
FIG. 7 is a perspective view of an illustrative embodiment of the single unit structure which defines the deep beehive body in accordance with the instant invention.

The deep hive body 14 of the instant invention overcomes such shortcomings of traditional bee hive boxes by constructing the hive body, whether as the deep hive body illustrated as 14 and 16 or the honey super bodies, illustrated as 24, as a single unit structure 84. FIG. 7 illustrates a perspective view of an illustrative example of the single unit structure construction of the deep hive body hive 14 or honey super body 24 illustrated in FIGS. 4 and 5. While the preferred embodiment of the deep hive body 14 is made of polyvinylchloride (PVC), other materials, including but not limited to other plastics or polymers, may be used. Preferably, the deep hive body 14 is made of a no-rot material. Such rot proof material is in contrast to conventional beehives that use wood which tends to rot out, decay, or decompose in 5-7 years, thus requiring replacement. Additionally, the deep hive body 14 is made of a food safe material. The single unit structure 84 can be manufactured using molding techniques, such as blow molding or injection molding, or other means known to one of skill in the art.

In contrast to standard beehives which use various types of wood, PVC extruded boards or sheet boards are preferable because it is more durable than wood, lasts longer, is easier to fold together, and does not need to be painted, thereby reducing the risks associated with exposing the bees to potentially harmful paint fumes and toxic treated wood materials. The single unit structure 84 contains a plurality of integral hinges 86 which allow the single unit structure 84 to be folded along each of the hinges to provide the desired shape necessary. For example, to construct the shape of the deep hive body 14, as illustrated in FIG. 4 or 5, the single unit structure 84 can be folded along each of the integral hinges 86. Each of the integral hinges or members 86 divides the single unit structure 84 into a plurality of segments, or sub-units 88, 90, 92, and 94. Each of the ends of the subunits may form straight edges. In a preferred embodiment, one or more of edges are angled, preferably at 45 degrees, see for example, angled edge 93 of subunit 92 on FIG. 7.

The integral hinge is preferably a thin flexible hinge or flexure bearing which joins at least two subunits, preferably the portion of the subunit having 45 degree angles, together, allowing each of the sub-units to fold along the line of the hinge, thereby forming the corner 95 of the body 14, see FIG. 4, or the corner 95 of honey super body 24, see FIG. 5. The sub-units 88-94 can be constructed to have the same or varying lengths, heights, the same or varying thicknesses, or combinations thereof. In an illustrative example, the single unit structure 84 is constructed and arranged to contain alternating units having differing lengths. For example, units 88 and 92 can be designed to be the same length, such as but not limited to, 19 ⅞", while units 90 and 94 can be designed to have the same length, such as but not limited to, 16⅜". The subunits of one or more single unit structure 84 may therefore be constructed of differing heights, lengths, thickness, or combinations thereof.

Each of the sub-units 88-92 forms the side walls 44, 46, 48, and 50 when folded along each of the integral hinges 86. The top edge 96 forms the upper perimeter 68 of the deep body hive 14. As illustrated in FIG. 7, the top edge 96 may contain a portion having a stepped region 98. The stepped region 98 may be used to provide support and securing of frame 30 to the deep hive body. The bottom edge 100 forms the lower perimeter 70 of the deep hive body 14. The perimeters 68 and/or 70 may further be constructed to contain features, for example ridges, channels, flanges (not illustrated), which allow stacking and securing of one hive body to another hive body. The single unit structure 84 may optionally contain one or more air vents 85 designed to provide free movement of air into the hive while preventing moisture from coming in. The air vents may, for example, contain membranes or screens which are made of air permeable/water impermeable material to allow for air to flow into the hive body but prevent moisture from entering into the hive.

The single unit structure 84 is further constructed in such a manner that folding at the integral living hinges 86 allows the first end 102 to connect or secure to the second end 104. Moreover, in the folded configuration, each of the integral hinges forms the corners of the deep hive body. One of the corners form the connection between the first end 102 and the second end 104. Securing could be as simple as using chemical fastening means such as permanent or semi-permanent glues. Alternatively, the first end 102 may be constructed and arranged to form the first member of a connecting joint which connects to the second member of a connecting joint constructed and arranged on the second end 104.

Figure 8:
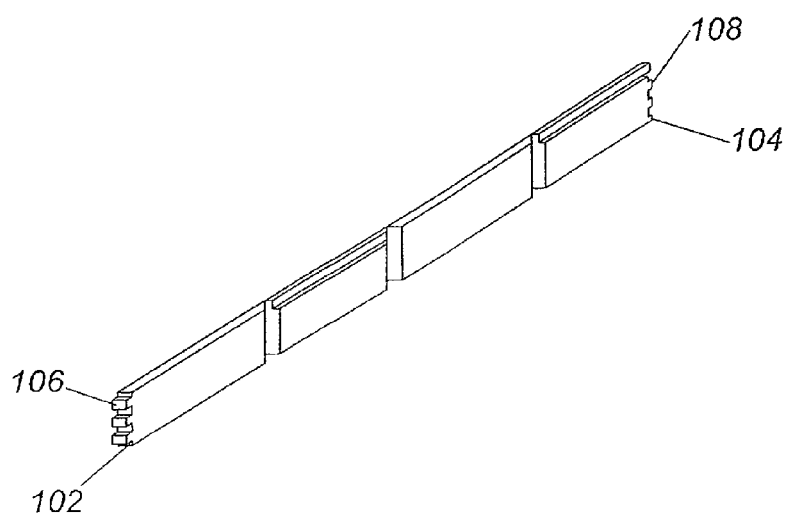
FIG. 8 is a perspective view of an alternative embodiment of the single unit structure which defines the deep beehive body in accordance with the instant invention.
Figure 9:
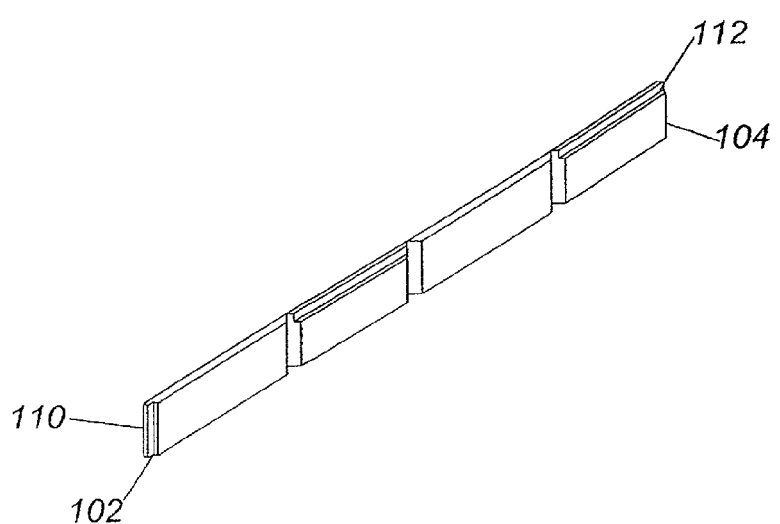
FIG. 9 is a perspective view of an alternative embodiment of the single unit structure which defines the deep beehive body in accordance with the instant invention, using a double dado configuration.
Figure 10:
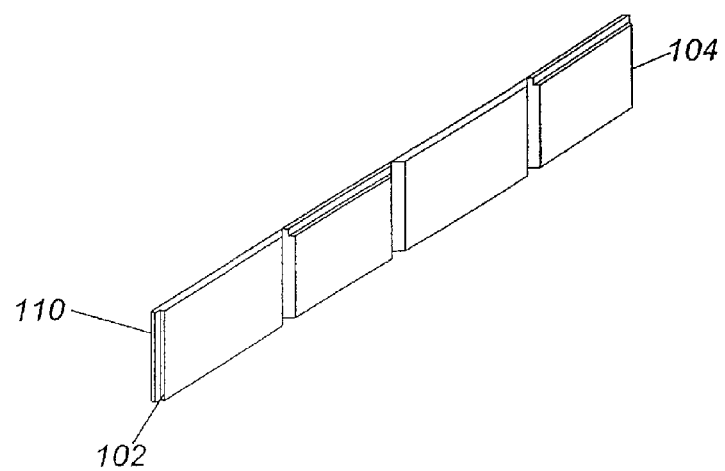
FIG. 10 is a perspective view of an alternative embodiment of the single unit structure which defines the deep beehive body in accordance with the instant invention, using a single dado configuration.
Figure 11:
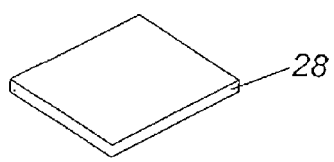
FIG. 11 is an exploded perspective view of a single unit structure containing a bottom board and cover.
Figure 11:
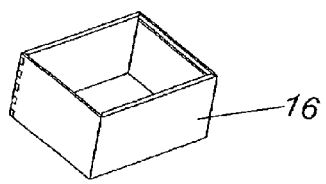
Figure 11:
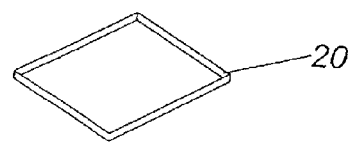

FIG. 8 illustrates the first end 102 and the second end 104 containing a first dovetail connection member 106 and a corresponding second dovetail connection member 108, respectively. Referring to FIG. 9, the first end 102 and the second end 104 are constructed and arranged to form a dado connection having a first dado member 110 and a corresponding second dado connection member 112. FIG. 10 illustrates the use of a single dado connection wherein the first end 102 contains the first dado member 110. Securing of the first end 102 to the second end 104 using dado or dovetail joints is illustrative only. Other connecting joints, such as, but not limited to, miter joints, end lap joints, box corner joints, known to one of skill in the art can be used as well.

The instant invention further contemplates a bee hive kit which includes all the necessary components to assemble a beehive. Accordingly, the kit includes one or more of the following: hive stand, outer cover, inner cover, a bottom board, a queen extruder, frames, and one or more hive bodies made of a single unit structure which can be manipulated to form the desired shape. The hive bodies can therefore be made to various shapes and sizes and can be used as brood storage or as honey storage. In an alternative embodiment, the kit may only contain one or more hive bodies made of a single unit structure. This allows easy and relatively cheaper shipping of a beehive body which can be assembled by the end user quickly and without the typical hassles that are associated with traditional beehive bodies.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A structure for housing species of bees comprising:
at least one single unit structure constructed from a plastic material shipped in a flat unfolded condition, said at least one single unit structure comprising a first end securable to a second end, and a main body there between, said main body having a rectangular shape when viewed from one of said ends defining a thickness and a height of said at least one single unit structure, said thickness being substantially uniform along a length of said main body and less than said height, said main body containing a plurality of living hinges spaced apart along the length of said main body, each said living hinge dividing said at least one single unit structure into a plurality of segments constructed and arranged to form walls of said at least one single unit structure when in a folded configuration, whereby said at least one single unit structure is maintained in an assembled rectangular configuration with a single connecting joint, at least two of said segments including a stepped region extending downward from a top inner surface thereof, said stepped regions positioned to be on opposite sides of said at least one single unit structure for supporting at least one removable frame;

at least one removable frame, said at least one removable frame sized to extend across a width of said assembled rectangular configuration of said at least one single unit structure to cooperate with said stepped regions and be housed within at least one of said at least one single unit structure;

a hive stand, said hive stand sized to support said at least one single unit structure in a stacked arrangement, said hive stand including a landing board sized for bees to land thereon for entrance to said at least one single unit structure through a bottom board positioned in a lowermost said at least one single unit structure, said bottom board sized to fill a bottom opening in said hive stand, said bottom board constructed and arranged to provide a means for bees to enter and exit said at least one single unit structure; and a cover constructed and arranged to enclose a top portion of said at least one single unit structure.

2. The structure for housing species of bees according to claim 1 wherein said first end includes a first portion of said connecting joint constructed and arranged to conjugately connect to said second end having a second portion of said connecting joint.

3. The structure for housing species of bees according to claim 2 wherein said connecting joint is a dovetail connection.

4. The structure for housing species of bees according to claim 2 wherein said connecting joint is a dado connection.

5. The structure for housing species of bees according to claim 1 wherein said at least one single unit structure contains at least one single unit structure constructed and arranged for housing a bee brood and at least one single unit structure constructed and arranged for housing honey or pollen, said at least one single unit structures being sized to include substantially equal shapes and perimeters so that one at least one single unit structure may be stacked on top of the other at least one single unit structure without creating air gaps between the two said at least one single unit structures.

6. The structure for housing species of bees according to claim 1 wherein one or more of said living hinges include beveled edges along each side of said living hinge, said beveled edges abutting with adjacent segment beveled edges to form one or more corners when in said folded configuration.

7. The structure for housing species of bees according to claim 1 wherein said at least one single unit structure contains one or more air vents.

8. The structure for housing species of bees according to claim 7 wherein said one or more air vents include a membrane which is air permeable and water impermeable.

9. The structure for housing species of bees according to claim 1 further including at least one screen, said at least one screen constructed and arranged for preventing movement of one or more bees within said structure.

10. A kit for forming a beehive comprising:

at least one single unit structure for forming a portion of the beehive, said at least one single unit structure constructed from a plastic material and provided in a flat unfolded condition, said at least one single unit structure having a first end, a second end, and a main body extending therebetween, said first end having a first portion of a connecting joint, said second end having a second portion of said connecting joint, said first portion and said second portion of said connecting joint constructed and arranged to connect to each other in a substantially conjugate manner to form a polygon shaped structure when folded, said main body having a rectangular shape when viewed from the one of said ends defining a thickness and a height of said at least one single unit structure, said thickness being substantially uniform along a length of said main body and less than said height, said main body containing a plurality of living hinges spaced apart along the length of said main body, each said living hinge dividing said at least one single unit structure into a plurality of segments constructed and arranged to form walls of said at least one single unit structure when folded along said living hinges, whereby said at least one single unit structure is maintained in an rectangular assembled configuration with a single said connecting joint, at least two of said segments including a stepped region extending downward from a top inner surface thereof for supporting at least one removable frame;

at least one removable frame, said at least one removable frame sized to extend across a width of said assembled rectangular configuration of said at least one single unit structure to cooperate with said stepped regions and be housed within at least one of said at least one single unit structure;

a hive stand, said hive stand sized to support said at least one single unit structure in a stacked arrangement, said hive stand including a landing board sized for bees to land thereon for entrance to said at least one single unit structure through a bottom board positioned in a lowermost said at least one single unit structure, said bottom board sized to fill a bottom opening in said hive stand, said bottom board constructed and arranged to provide a means for bees to enter and exit said at least one single unit structure; and an outer cover constructed and arranged to enclose a top opening in said polygon shaped at least one single unit structure, wherein each said at least one single unit structure is supplied in a flat unfolded condition and forms a portion of the beehive when folded.

11. The kit for forming a beehive according to claim 10 further including an inner cover, a separating member constructed and arranged to prevent one or more bees from moving vertically through said at least one single unit structures in a stacked arrangement.

* * * * *